United States Patent
Bronner et al.

(10) Patent No.: US 7,380,833 B2
(45) Date of Patent: Jun. 3, 2008

(54) DEFLECTION FITTING FOR THE SAFETY BELT OF A MOTOR VEHICLE

(75) Inventors: Martin Bronner, Lohr/Main (DE); Wolfgang Kruner, Florschachtal (DE); Uwe Happ, Lohr (DE)

(73) Assignee: Intier Automotive Seating Systems GmbH, Grossostheim-Ringheim (DE)

( * ) Notice: Subject to any disclaimer, the term of this patent is extended or adjusted under 35 U.S.C. 154(b) by 293 days.

(21) Appl. No.: 10/416,605

(22) PCT Filed: Nov. 13, 2001

(86) PCT No.: PCT/IB01/02136

§ 371 (c)(1),
(2), (4) Date: Aug. 1, 2005

(87) PCT Pub. No.: WO02/38423

PCT Pub. Date: May 16, 2002

(65) Prior Publication Data

US 2006/0017274 A1    Jan. 26, 2006

(30) Foreign Application Priority Data

Nov. 13, 2000 (DE) ................. 100 56 127

(51) Int. Cl.
*B60R 22/28* (2006.01)
*B60R 22/18* (2006.01)

(52) U.S. Cl. .................. 280/808; 280/801.1; 280/805; 297/472; 297/483

(58) Field of Classification Search ............ 280/801.2, 280/801.1, 808, 805; 297/472, 483
See application file for complete search history.

(56) References Cited

U.S. PATENT DOCUMENTS

| 3,877,114 | A | | 4/1975 | Silen |
| 4,341,359 | A | * | 7/1982 | Jahn ............................ 242/377 |
| 4,518,174 | A | * | 5/1985 | Sedlmayr ................. 280/801.2 |
| 4,607,864 | A | * | 8/1986 | Kouketsu et al. ........... 280/808 |
| 4,650,214 | A | * | 3/1987 | Higbee ........................ 280/808 |
| 4,838,388 | A | * | 6/1989 | Cunningham .............. 188/65.1 |
| 4,982,982 | A | * | 1/1991 | Nishimura .................. 280/808 |
| 4,989,901 | A | * | 2/1991 | Adomeit .................. 280/801.2 |
| 5,096,224 | A | | 3/1992 | Murakami et al. |
| 5,385,370 | A | | 1/1995 | Wickenheiser et al. |
| 5,988,758 | A | * | 11/1999 | Heintzelman et al. ...... 297/483 |
| 6,250,684 | B1 | * | 6/2001 | Gleason et al. ............. 280/808 |
| 6,520,588 | B1 | * | 2/2003 | Busch ........................ 297/483 |

FOREIGN PATENT DOCUMENTS

DE    26 01 171 A    7/1977

* cited by examiner

*Primary Examiner*—Lesley D. Morris
*Assistant Examiner*—George D Spisich
(74) *Attorney, Agent, or Firm*—Clark Hill PLC

(57) ABSTRACT

A deflection fitting for the safety belt of a motor vehicle comprising a belt guide (17, 18) which encircles the safety belt (7) and a pivot bearing (13) about which the belt guide is pivoted about a pivot pin (14) and parallel to the direction in which the belt passes through. The pivot bearing is adapted to be fixed to the vehicle. The belt guide includes at least two chain links (17, 18) which can pivot independently of each other in the pivot bearing (13), respectively, and which are located some distance apart from each other in the direction in which the belt (7) passes through. This configuration enables easy adjustment of the belt guide, even when the angles of the strands (8, 9) of the belt (7) deviate considerably from the standard.

4 Claims, 2 Drawing Sheets

DEFLECTION FITTING FOR THE SAFETY BELT OF A MOTOR VEHICLE

Figure 1:
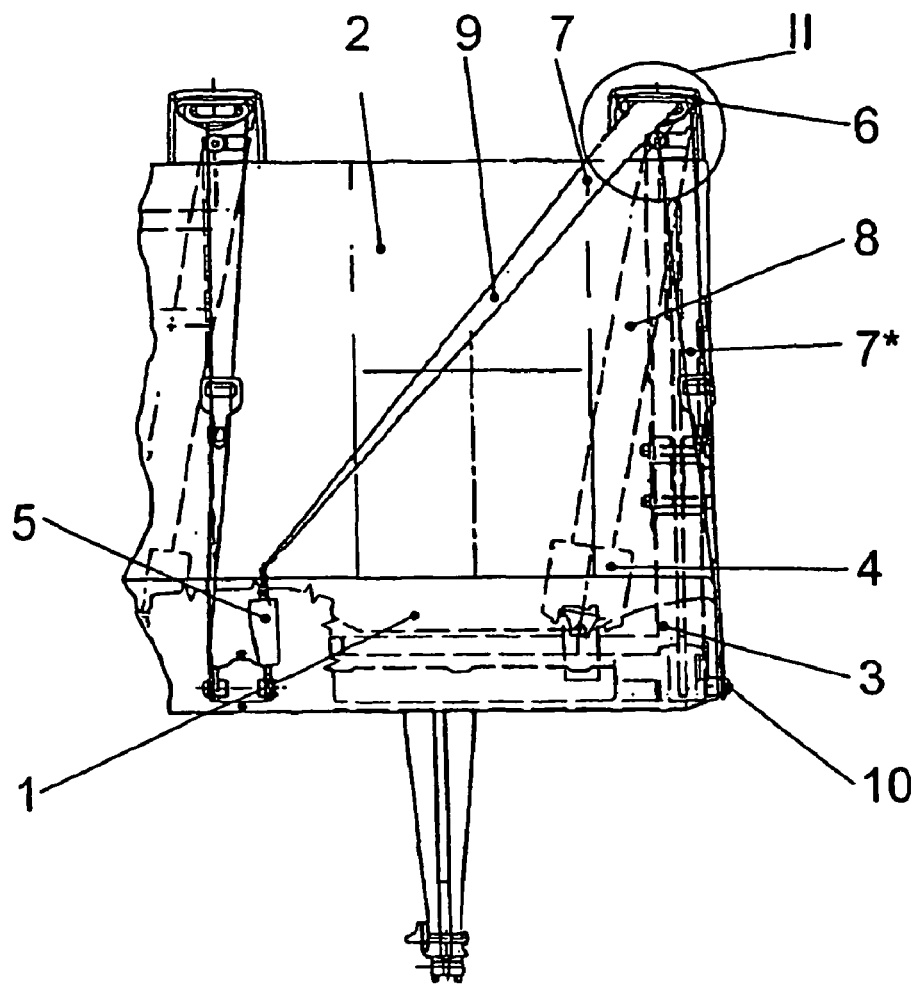

The invention relates to a deflecting fitting for the safety belt of a motor vehicle, said fitting consisting of a belt guide which encloses the safety belt and of a swivel bearing about which said belt guide can be swivelled about an axis parallel to the direction of running through of the belt, wherein the swivel bearing is fastened to the vehicle or to a part connected thereto.

Deflecting fittings are used in all possible arrangements of safety belts which extend over the shoulder of the driver or passenger wearing them. Said fittings ensure that the belt, which is fastened by one end at the side of, below, behind or next to the passenger, is guided over the shoulder in question at all times, that is to say irrespective of the sitting position.

Deflecting fittings are therefore attached, at or above shoulder height, to the B or C pillar of the vehicle or to the backrest of the seat in question; see, for example, DE 198 14 845 A1. Their main component is a belt guide which is a closed, flattened chain link which encompasses the belt. Said chain link consists of two parallel straight parts, over one of which the belt runs downwards and which are connected by a tightly curved part. If the strands of the belt which run upwards and downwards are oriented perpendicularly to the straight part of the chain link and are not twisted, the belt runs downwards without any problems. If the angles of the two strands deviate from the perpendicular, the chain link tends to adjust itself according to the line bisecting the angle of the strands.

As a result of this, however, the quality of the guidance declines, particularly if adjustment of the chain link is hindered by friction, and on account of the small distance from the swivel bearing. Under these circumstances, the belt shifts into the tightly curved part of the chain link and thus becomes folded or completely turned over. This causes particular problems in the case of deflecting fittings which are fastened to the seat rest and in which the angular deviation from the perpendicular is, as a rule, greater.

From the generic DE-A 26 01 171, a deflecting fitting is known which has two guide members which can be swivelled, independently of one another, about an axis of swivelling and are disposed at a distance from one another, said guide members being formed by a run-through eye and a swivel arm which is provided with a deflecting eye at its free end. The direction in which the belt runs through between the guide members extends, in a manner corresponding to the swivel arm, approximately parallel to the side wall of the vehicle and thereby perpendicular to the axis of swivelling. As a result of this, however, a relatively large angle of splay of the belt occurs in the deflecting region.

U.S. Pat. No. 5,385,370 indicates two so-called "D-rings" as the chain links, which can be moved in a swivelling manner, of a deflecting fitting. However, these are offset in relation to one another at the lateral distance between the openings of the rings and are associated with different belts, so that there are problems, as initially mentioned, in the quality of guidance for the individual belt.

It is therefore the aim of the invention to provide a deflecting fitting which does not suffer from these disadvantages. The intention is that it should adjust itself easily, even in the event of large angular deviations from the perpendicular and of fairly large angles of torsion.

According to the invention, this is achieved through the fact that the belt guide can be swivelled about an axis parallel to the direction of running through of the belt and consists of two chain links which can each be swivelled, independently of one another, in the swivel bearing and which are disposed at some distance from one another. Since the two chain links are capable of twisting in relation to one another, larger angular deviations are possible without defective running of the belt, the small clearance of the axis of swivelling even proving to be an advantage. The distance between the two chain links allows the belt to twist slightly. In the process, the outer braids of the belt are subjected to somewhat greater tension, which makes it still more difficult for the belt to creep up into the sharply curved part of the chain links.

In one advantageous form of embodiment, each chain link possesses a bearing eye through which the swivel bolt passes, and a bush is provided between the two bearing eyes. The bush serves as a bearing, so that the chain link is able to adjust itself with little friction, and said bush also serves as a spacer between the two chain links. The bush may be constructed in such a way that the swivel bolt is fastened, by means of the bush, to the vehicle or to a part connected thereto. The swivel bolt thus serves only for mounting the two chain links with equally little friction, and fastening via the bush brings about central stressing of said swivel bolt.

In one advantageous further development, the bush is fastened to a safety shackle and is interrupted in its peripheral direction, said safety shackle possessing an intercepting arm on which the safety belt rests if the bush is torn open. In addition to its retaining function, the safety shackle thus also acts as a graduated, second safety device if the stress on the bush exceeds a limit value in the event of a collision. The swivel bolt with the two chain links is then released and the belt is supported on the intercepting arm, which may be of heavier dimensions.

Finally, the invention may be used with special advantage if the safety shackle is fastened to the backrest of a seat. The invention therefore also provides a motor vehicle seat having a deflecting fitting according to one of the preceding claims.

Figure 2:
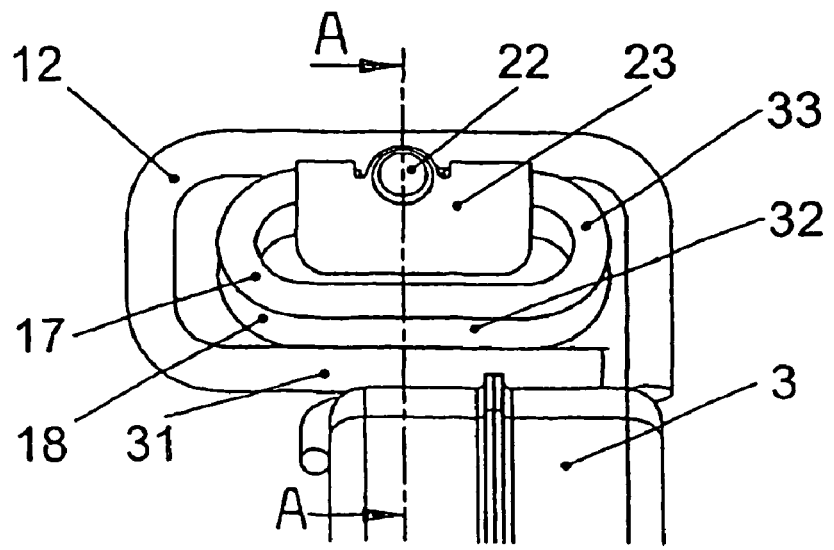
Figure 3:
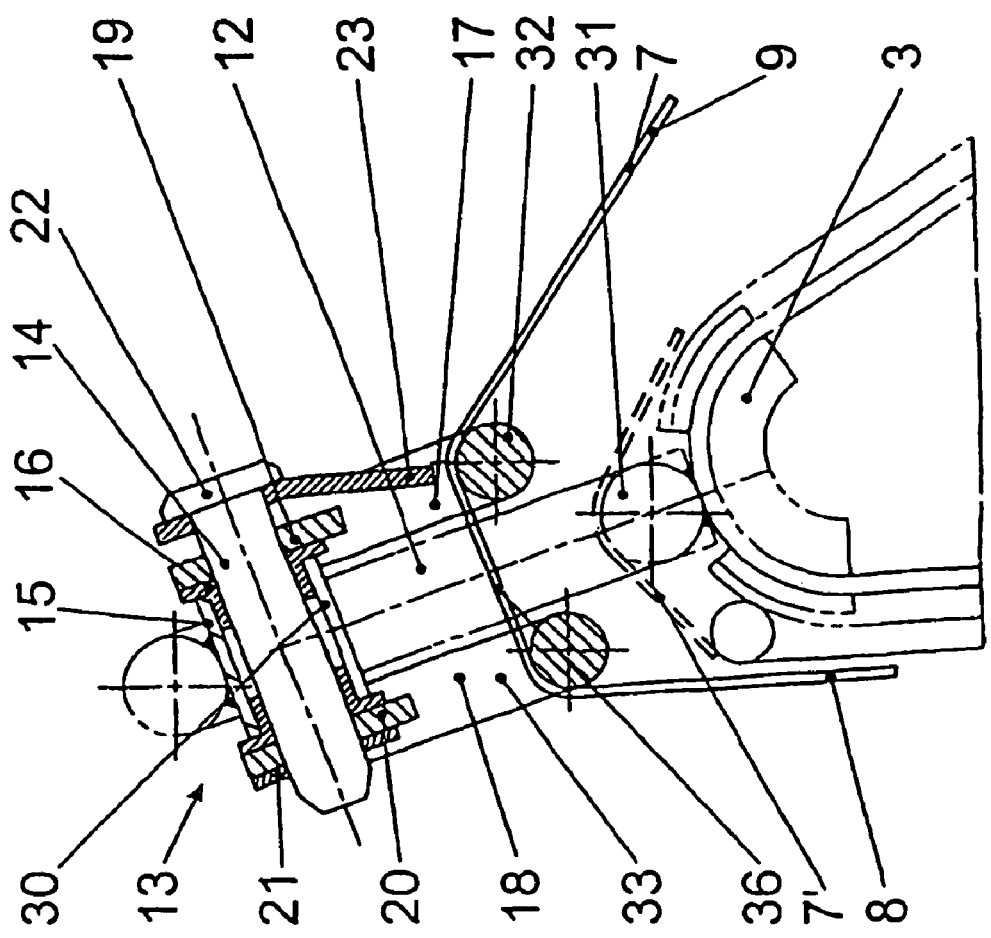

The invention will be described and explained below with the aid of illustrations, in which:

FIG. 1: represents a seat having a deflecting fitting according to the invention, from the front;

FIG. 2: represents, in enlarged form, the detail II in FIG. 1;

FIG. 3: represents, enlarged still further, the section AA in FIG. 2; and

Figure 4:
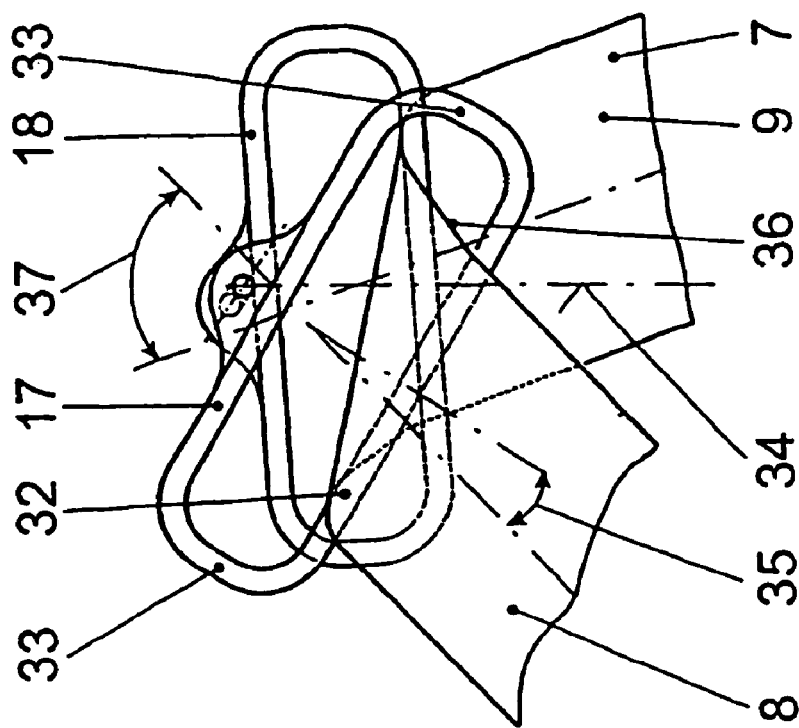

FIG. 4: is a representation like that in FIG. 2, but in an extreme position.

FIG. 1 shows, in part, a bench seat in a motor vehicle. Said seat consists of a seating surface 1 and a backrest 2, with a seat frame 3. A belt reel 4 is fastened, behind the seat and therefore in a manner shown in broken lines, to the said seat frame, a belt lock 5 is fastened next to the seating surface 1 and a deflecting fitting 6 is fastened above the seat. The belt reel 4 contains the usual winding-on and clamping mechanism. In this instance, the deflecting fitting 6 is provided on the backrest 2 at the top, above the shoulder of a passenger, who is not represented, but said fitting could also be fastened to the side wall of the vehicle, which side wall is likewise not represented.

For the sake of simplicity, a seat belt 7 is represented only in the form of a shoulder belt. It then consists of a first (upward-running) strand 8, which extends from the belt reel 4 to the deflecting fitting 6, and of a second strand 9, the downward-running strand, which extends from the deflecting fitting 6 to the belt lock 5. If the belt in question is a three-point one, a fastening point 10, to which the safety belt is then conveyed onwards, is provided on the other side of the passenger. The second strand 9 then forms a loop which extends from the belt lock 5 to the said fastening point 10. 7* designates a three-point belt of this kind in the inoperative position.

FIGS. 2 and 3 show the deflecting fitting 6 in detail. Fastened, for example welded on, to the seat frame 3 is a safety shackle 12 from which the belt guide is suspended in a swivel bearing 13. Said swivel bearing 13 is formed by a swivel bolt 14 which is mounted in a bush 15 by means of bearing shells 16 which act as radial and step bearings. Said bush 15 is fixedly connected, for instance welded, to the safety shackle 12.

According to the invention, the belt guide is formed by two chain links 17, 18 which can be swivelled, independently of one another, about the swivel bolt 14. Said chain links possess bearing eyes 19, 20 through which the swivel bolt 14 passes. For fixing it in position axially, the swivel bolt 14 possesses a head 22 and, at the other end, a washer 21 which is followed, for example, by a split pin which is not represented. In addition, a metal diverting plate 23 is also provided on the swivel bolt.

On its outer periphery, the bush 15 has a slit 30, as a result of which it opens under extreme load, in the event of a collision, and the safety belt 7, together with the belt guide, falls onto an intercepting arm 31 belonging to the safety shackle 12, a fact which is drawn in in broken lines in FIG. 3 and designated by 7'.

The chain links 17, 18 are closed steel rings which consist of two straight parts 32 and two sharply curved parts 33, and are thus similar to links which have been pressed together in an ordinary chain.

The action of the chain links 17, 18, which can be swivelled independently of one another, will now be explained with the aid of FIG. 4, which shows the belt guide in an extreme case in which the two strands 8, 9 of the safety belt 7 form a considerable angle 37 with one another. A belt guide having a single chain link according to the prior art would adjust itself to the line 34 bisecting the angle. The belt would then run obliquely through the chain link, namely at an oblique angle amounting to about half the angle 37. As a result of this, the belt easily arrives in the sharply curved part 33 of the chain link, climbs up it and is folded or completely twisted.

Owing to the two chain links 17, 18, which can be swivelled independently of one another, and to their distance from one another in the longitudinal direction of the belt, said two chain links 17, 18 can adjust themselves in such a way that the oblique angle 35 of the upward-running strand 8 of the belt 7 in the chain link 17, and likewise that of the downward-running strand 9 in the chain link 18 is substantially smaller. The part 36 of the safety belt 7 between the two chain links 17, 18 (see also FIG. 3) is slightly twisted in the process.

The consequence of the small oblique angle is that the belt 7 is no longer able to creep upwards at the sharply curved parts 33 of the chain links 17, 18. The same action also occurs if the deflecting fitting 6 is fastened to the vehicle body, for instance to a B pillar which is not represented, in spite of said deflecting fitting being disposed in a manner rotated about a right angle.

The invention claimed is:

1. A defecting fitting for a safety belt of a motor vehicle, said fitting comprising a belt guide (17, 18) which encircles the safety belt (7) and a swivel bearing (13) about which said belt guide can be swiveled, wherein the swivel bearing (13) is adapted to be secured to the vehicle and wherein the belt guide (17, 18) can be swiveled about an axis parallel to the direction of running through of the belt, characterized in that the belt guide (17, 18) includes at least two chain links (17, 18) which can each be swiveled, independently of one another, in the swivel bearing (13) and which are disposed at some distance from one another in the direction of running through of the belt (7) and wherein each chain link (17, 18) includes a bearing eye (19, 20) through which a swivel bolt (14) passes, and a bush (15) between the two bearing eyes, and the bush (15) is fastened to a safety shackle (12) and is provided with a longitudinal slit (30), wherein said safety shackle (12) includes an intercepting arm (31) on which the safety belt (7) rests if the bush (15) is torn open.

2. A defecting fitting for a safety belt of a motor vehicle, said fitting comprising a belt guide (17, 18) which encircles the safety belt (7) and a swivel bearing (13) about which said belt guide can be swiveled, wherein the swivel bearing (13) is adapted to be secured to the vehicle and wherein the belt guide (17, 18) can be swiveled about an axis parallel to the direction of running through of the belt, characterized in that the belt guide (17, 18) includes at least two chain links (17, 18) which can each be swiveled, independently of one another, in the swivel bearing (13) and which are disposed at some distance from one another in the direction of running through of the belt (7) find wherein each chain link (17, 18) includes a bearing eye (19, 20) through which a swivel bolt (14) passes, and a bush (15) between the two bearing eyes, wherein said swivel bolt is adapted to be fastened to the vehicle by means of said bush, and the bush (15) is fastened to a safety shackle (12) and is provided with a longitudinal slit (30), wherein said safety shackle (12) includes an intercepting arm (31) on which the safety belt (7) rests if the bush (15) is torn open.

3. A deflecting fitting according to claim 1 or 2, characterized in that the safety shackle (12) is fastened to the backrest (2) of a seat.

4. A motor vehicle seat having a deflecting fitting (6) according to claim 1 or 2.

* * * * *

UNITED STATES PATENT AND TRADEMARK OFFICE
CERTIFICATE OF CORRECTION

| | |
|---|---|
| PATENT NO. | : 7,380,833 B2 |
| APPLICATION NO. | : 10/416605 |
| DATED | : June 3, 2008 |
| INVENTOR(S) | : Bronner et al. |

Page 1 of 1

It is certified that error appears in the above-identified patent and that said Letters Patent is hereby corrected as shown below:

ON THE TITLE PAGE:
item 75

The correct name of the second inventor is WOLFGANG KRONER.

Col. 4 line 9, please replace "defecting" with --deflecting--.

Signed and Sealed this

Nineteenth Day of August, 2008

JON W. DUDAS
*Director of the United States Patent and Trademark Office*